US012743274B2

(12) United States Patent
Kumawat

(10) Patent No.: US 12,743,274 B2
(45) Date of Patent: Sep. 22, 2026

(54) CHAINED PULL REQUESTS IN A SOURCE CODE MANAGEMENT SYSTEM

(71) Applicants: Atlassian Pty Ltd., Sydney (AU); Atlassian US, Inc., San Francisco, CA (US)

(72) Inventor: Nirmal Kumawat, Bangalore (IN)

(73) Assignees: Atlassian Pty Ltd., Sydney (AU); Atlassian US, Inc., San Francisco, CA (US)

( * ) Notice: Subject to any disclaimer, the term of this patent is extended or adjusted under 35 U.S.C. 154(b) by 821 days.

(21) Appl. No.: 17/956,629

(22) Filed: Sep. 29, 2022

(65) Prior Publication Data

US 2024/0111523 A1 Apr. 4, 2024

(51) Int. Cl.
*G06F 8/71* (2018.01)
*G06F 16/22* (2019.01)

(52) U.S. Cl.
CPC ............ *G06F 8/71* (2013.01); *G06F 16/2246* (2019.01)

(58) Field of Classification Search
CPC ................................ G06F 8/71; G06F 16/2246
See application file for complete search history.

(56) References Cited

U.S. PATENT DOCUMENTS 9,430,229 B1 * 8/2016 Van Zijst .............. G06F 9/3844
9,471,304 B1 * 10/2016 Fuchs ....................... G06F 8/71
2008/0196012 A1 * 8/2008 Cohen ....................... G06F 8/75 717/125
2009/0210852 A1 * 8/2009 Martineau ................. G06F 8/71 717/101
2014/0297592 A1 * 10/2014 Ohtake ..................... G06F 8/71 707/638
2018/0084086 A1 * 3/2018 Newman ................. H04L 67/02
2019/0026697 A1 * 1/2019 Burton ...................... G06F 8/71
2021/0141718 A1 * 5/2021 Sandhu ..................... G06F 8/60

(Continued)

OTHER PUBLICATIONS

Tapajit Dey et al., "Which Pull Requests Get Accepted and Why? A study of popular NPM Packages," 2020 [retrieved Jun. 8, 2025], pp. 1-11, downloaded from <url>:https://arxiv.org/abs/2003.01153. (Year: 2020).*

(Continued)

*Primary Examiner* — S. Sough
*Assistant Examiner* — Stephen D Berman
(74) *Attorney, Agent, or Firm* — Brownstein Hyatt Farber Schreck, LLP

(57) ABSTRACT

Methods and computer readable medium for automatically creating chained pull requests are disclosed. The method includes: indexing one or more changes made to a plurality of files in a feature branch of a source code repository. Each indexed change represented by a key and value. The method further includes determining one or more relationships between the plurality of changed files based on the indexed changes, generating a directed graph including one or more parent nodes and one or more children nodes based on the determined one or more relationships between the plurality of changed files, and segmenting the directed graph into a plurality of trees. Each tree includes a single parent node. The method further includes creating a chain of pull requests based on the plurality of trees. Each pull request in the chain of pull requests is based on a tree of the plurality of trees.

22 Claims, 10 Drawing Sheets

(56) References Cited

U.S. PATENT DOCUMENTS

| | | | | |
|---|---|---|---|---|
| 2021/0255854 | A1* | 8/2021 | Coscarelli | G06F 8/71 |
| 2022/0164672 | A1* | 5/2022 | Bird | G06F 8/71 |
| 2023/0236811 | A1* | 7/2023 | Sundaresan | G06N 3/096 717/110 |

OTHER PUBLICATIONS

Danny Preussler, "The Art of Pull Requests," 2017 [retrieved Jun. 8, 2025], pp. 1-13, downloaded from <url>:https://medium.com/hackernoon/the-art-of-pull-requests-6f0f099850f9. (Year: 2017).*
Anonymous, "How to find LCA in a directed acyclic graph?," 2020 [retrieved Jun. 8, 2025], pp. 1-2, downloaded from <url>:https://web.archive.org/web/20201124124759/https://cs.stackexchange.com/questions/90119/how-to-find-Ica-in-a-directed-acyclic-graph. (Year: 2020).*
Github, "Depth-first Tree Traversal," 2020 [retrieved Jun. 11, 2025], pp. 1-6, downloaded from <url>:https://web.archive.org/web/20201225235543/https://github.com/sf-wdi-31/depth-first-search. (Year: 2020).*
Lorenzo Gasparini et al., "ChangeViz: Enhancing the GitHub Pull Request Interface with Method Call Information," 2021 [retrieved Oct. 17, 2025], 2021 Working Conference on Software Visualization (VISSOFT), pp. 115-119, downloaded from <url>:https://ieeexplore.ieee.org/abstract/document/9604885. (Year: 2021).*
Saad Malik, "Git repository visualization: Visualizing file authorship and dominance," 2017 [retrieved [Nov. 17, 2025], pp. 1-48, downloaded from <url>:https://dspace.library.uvic.ca/server/api/core/bitstreams/1c054454-0b5c-48a3-b963-dfaa5dc63c55/content. (Year: 2017).*
Hamzeh Eyal Salman et al., "Automatic Identification of Similar Pull-Requests in GitHub's Repositories Using Machine Learning," Feb. 3, 2022 [retrieved Nov. 17, 2025], pp. 1-24, downloaded from <url>:https://www.mdpi.com/2078-2489/13/2/73. (Year: 2022).*
Juan Camilo Rojas et al., "Efficient Search Algorithms Leveraging Inverted Indexing and Parallel Processing for Large-Scale Commonsense Knowledge Repositories," Apr. 4, 2020 [retrieved Nov. 17, 2025], pp. 1-15, downloaded from <url>:https://northernreviews.com/index.php/NRATCC/article/view/2020-04-04/10. (Year: 2020).*
Daniel German et al., "Change impact graphs: Determining the impact of prior codechange", [retrieved May 2, 2026], pp. 1394-1408, downloaded from <url>:https://www.sciencedirect.com/science/article/pii/S095058490900069X. (Year: 2009).*

* cited by examiner

CHAINED PULL REQUESTS IN A SOURCE CODE MANAGEMENT SYSTEM

TECHNICAL FIELD

The present disclosure generally relates to version control systems as used in computer program development, and in particular, techniques for automatically creating chained pull requests in version control systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computer software development, various software programs or systems may be used to track and manage computer program source code as the code is written and revised. In modern development environments, multiple users may need to access a common repository or source code management system. The systems and techniques described herein can be used to facilitate access to source code and other materials relevant to development activities on a networked system.

SUMMARY

According to a first aspect of the present disclosure, there is provided a computer-implemented method. The method includes indexing one or more changes made to a plurality of files in a feature branch of a source code repository. Each indexed change may be represented by a key and value. The method further includes determining one or more relationships between the plurality of changed files based on the indexed changes, and generating a directed graph including one or more parent nodes and one or more children nodes based on the determined one or more relationships between the plurality of changed files. The method further includes segmenting the directed graph into a plurality of trees, where each tree comprising a single parent node, and creating a chain of pull requests based on the plurality of trees. Each pull request in the chain of pull requests may be based on a tree of the plurality of trees.

According to a second aspect of the present disclosure, there is provided a computer-readable medium comprising instructions, which when executed by a processing unit cause the processing unit to: cause one or more changes made to a plurality of files in a feature branch of a source code repository to be indexed. Each indexed change may be represented by a key and value. The computer-readable medium further comprising instructions, which when executed by the processing unit cause the processing unit to determine one or more relationships between the plurality of changed files based on the indexed changes, and generate a directed graph including one or more parent nodes and one or more children nodes based on the determined one or more relationships between the plurality of changed files. The computer-readable medium further comprising instructions, which when executed by the processing unit cause the processing unit to segment the directed graph into a plurality of trees, where each tree comprising a single parent node, and create a chain of pull requests based on the plurality of trees. Each pull request in the chain of pull requests may be based on a tree of the plurality of trees.

Figure 1:
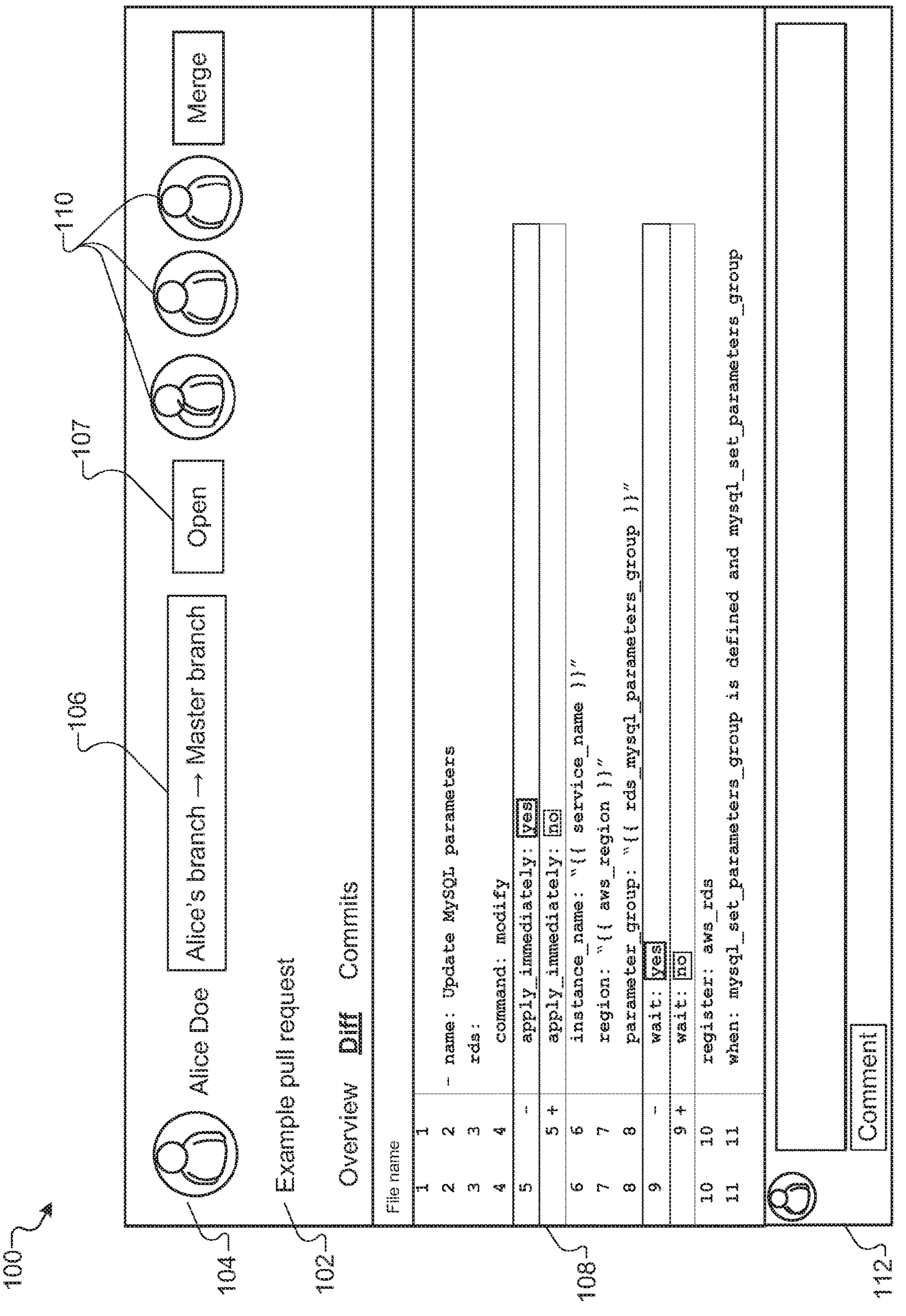
FIG. 1 illustrates a typical pull request interface.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In computer software development, version control systems, also called source code management (SCM) systems, are used to track and manage computer program source code as the code is written and revised. SCM systems include centralized version control systems and distributed version control systems. Centralized SCM systems typically manage a single copy of a project in a centralized location such as a server computer, and programmers commit changes to the central copy.

Distributed SCM systems such as Mercurial, Git, and Bazaar, do not necessarily use a centralized server computer to store all versions of the code. Each programmer may create a copy of the program source code, termed a clone, which is locally stored in a repository of that programmer or a group; the repository maintains metadata representing a complete history of a project involving the original code, the programmer's changes, and often changes of other programmers. SCM systems with distributed version control typically enable programmers to create, revise, and store computer program source code in the form of text files. The SCM system typically saves a revision to source code by overwriting an existing version of a source code file with a new version of the file. If a programmer revises the source code, stores the new version in the file, compiles the new version of the file, and learns that the execution of the compiled new version results in an error, the programmer may be able to identify the specific revision that introduced the error if the programmer can restore the old version of the file. An SCM system with a version control feature can facilitate the identification of errors by enabling a programmer to access previous and current versions of the source code. These SCM systems support operation with many users who are widely distributed across distant geographic locations yet working on the same source code project, by communication over internetworks.

This approach enables each user to have a full history of the source code. The second copy of the repository may be termed a fork, and the original repository on the server computer may be termed a canonical, main repository, or upstream repository. The SCM system also may enable a user to duplicate or clone the fork, store the clone on the user's computer, work on the clone, and then merge the clone back to the upstream repository, or merge the clone back to a clone of the fork that is on the server computer. With this approach, many users can work on clones of the fork and exchange revisions.

SCM System Overview

Aspects of the present disclosure are implemented on SCM systems. For example, certain aspects of the present disclosure may be implemented using an on-premises SCM system such as Bitbucket Server, which is commercially available from Atlassian, Inc., and provides a Git repository management system for enterprise users in which repositories are stored on computers that are isolated from the public internet by firewalls and/or other appropriate security systems. Git is a distributed version control and source code management system with an emphasis on speed that was initially developed for Linux kernel development. Each Git working directory is a code repository that has complete history and revision tracking metadata and functions, and is not dependent on network access or a central server.

Other aspects of the present disclosure may be implemented using computers and systems configured in a remote shared data center or cloud computing infrastructure, for example, using Bitbucket Cloud, which also is commercially available from Atlassian. Bitbucket supports storing source code in cloud-based computing instances, in either public or private repositories. Both Bitbucket Server and Bitbucket Cloud support user authentication, repository security, and integration with existing databases and development environments, for use with up to large numbers of users, including thousands of users per repository.

Merging and branching are two concepts used in most SCM systems. Merging comprises combining two or more sets of changes to version-controlled files to result in a merged version with all the changes. In some cases, such as when two or more sets of changes do not conflict, merging may be automatically performed. For example, automatic merging typically involves two non-conflicting sets of changes of two different users to a set of files. If the changes conflict, then manual merging is typically used to reconcile conflicts.

Branching comprises duplication of a source code file, directory tree, or other item that is subject to version control, so that changes can be made to the original and the duplicate, each of which is termed a branch. Branches may be termed streams, or code lines. The original branch may be termed the parent branch, master branch, upstream branch, or backing stream. Duplicate branches may be termed child branches. A branch without a parent branch may be termed a trunk or mainline. Changes to a child branch may be merged into the parent branch, or merged into the trunk, even if the trunk is not a direct parent of the child branch. A repository that is derived from and related at least in part to an upstream repository may be termed a fork; typically, a fork is subject to different licensing terms, serves a different purpose, or implements a different feature or function, as compared to its parent.

Further, SCM systems such as Bitbucket Server or Bitbucket Cloud include a pull request feature. Generally speaking, a pull request defines a request to merge changes from a source branch to a destination branch, either within the same repository or across clones or forks. The term "pull request" derives from the notion of requesting a manager of the upstream branch for permission to pull a downstream programmer's changes up into the upstream branch, and typically involves review and approval by a user other than the programmer who made the changes. Accepting a pull request comprises or results in merging the source branch into the destination branch.

A pull request may be displayed to one or more reviewers in a user interface (e.g., in a browser). FIG. 1 illustrates a typical pull request interface 100. As shown in the illustration, the pull request interface typically displays, e.g., the name of the pull request 102, the author 104, the source and destination branches 106, a status of the pull request 107, and differences in source code between the state of the source branch when the pull request is generated and the state of the destination branch 108 when the source branch was forked from the destination branch. In computing, a file comparison utility program generically termed 'a diff' is configured to output the differences between two source code files. A diff typically is used to show the changes between one version of a file and a former version of the same file; diff usually displays the changes that are made, per line, for text files. In one example, the differences between the two versions of the file may be highlighted. For instance, if the source branch (new version of the source code file) includes additional code lines that did not exist in the destination branch before the source branch was forked from the destination branch (former version of the source code file), these lines may be highlighted in green. Any deleted code lines may be highlighted in red. The pull request interface 100 may also display information about reviewers 110 of the pull request and a comment section 112 for one or more reviewers/authors to enter comments. The comment section may also display any previous comments made for that pull request.

However, there are some issues with pull requests. In particular, if there are a large number of changes between the master branch and the user's forked branch (that affect a large number of code files), an unusually high cognitive burden is placed on the reviewer to review all the suggested changes.

To address this issue, some known SCM systems provide a mechanism to create "chained" or "stacked" pull requests. In this case, each pull request in the chain or stack includes an incremental change to its predecessor pull request.

However, there are some challenges even with this solution. One of the challenges is that a developer has to manually create the chain or stack. In particular, the developer has to determine the number of files that are affected by the code change, then try to reduce the number of changes made to these files to create smaller pull request, and then add the removed changes to subsequent pull requests to manually create a chain or stack. This requires an in-depth understanding of chained pull requests, identifying the first pull request for the chain, etc, and many developers may be unaware of this or may not be able to create chained pull requests correctly.

Aspects of the present disclosure attempt to address one or more of these issues with creating chained pull requests. In particular, aspects of the present disclosure provide a chained pull request generator that can intelligently and automatically create a chain of two or more pull requests from a large pull request.

The presently disclosed systems and methods do so by identifying all the files changed by a developer, categorizing these files into different categories based on type and then creating multiple pull requests, where each pull request includes files of a particular type that are related to other files of that type. As referred to herein related files refer to files that are either affected by changes in other files or include changes that affect other files). By creating pull requests that include related changes aspects of the present disclosure allow related changes to be reviewed and merged at the same time in the master branch-preventing any errors or dependency issues from arising.

These and other features of the claimed invention are described in detail in the following sections.

System Overview

Figure 2:
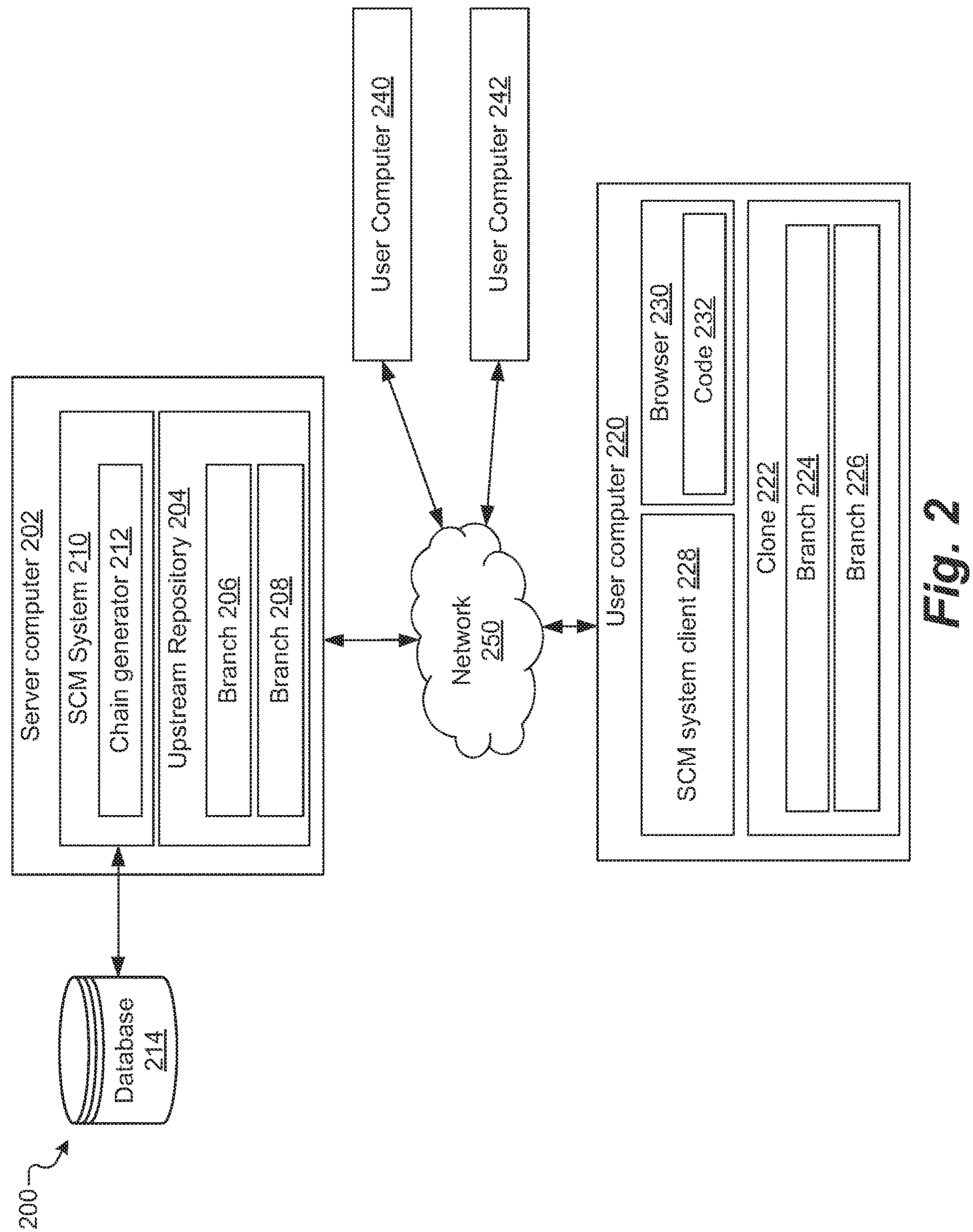
FIG. 2 illustrates an example networked environment in which embodiments of the present disclosure may be implemented.

FIG. 2 illustrates an SCM system 200 having an upstream repository with branches and a clone with other branches according to one embodiment. The SCM system 200 may comprise a server computer 202 coupled directly or indirectly through one or more networks 250 to one or more user computers 220, 240 and 242. The server computer 202 hosts an upstream repository 204 that stores source code 205 for a project or application. As an example, the source code 205 may comprise one or more branches 206, 208. In this context, a branch may refer to a named set of computer program code, typically a set related to a particular feature or function, such as a set of classes or methods.

Network 250 may include a local area network (LAN) of an enterprise in one embodiment; in this case, the SCM system 200 may be implemented as an on-premises solution in which the server computer 202 and user computers 220, 240 and 242 are associated with the same business enterprise and at least the server computer 402 is within an enterprise-controlled facility that is protected from open internetworks using firewalls or other security systems. In another embodiment, network 250 may represent a public internetwork and the server computer 202 may be located off-premises with respect to an organization involved in software development, such as in a shared data center or cloud computing facility.

User computer 220 and user computers 240, 242 each may host a clone repository 222 comprising a copy 225 of source code. The copy 225 generally duplicates the source code 205 of the upstream repository 204. The clone repository 222 may comprise one or more branches 224, 226 for use by a particular user of the user computer 220. In an embodiment, branches 224, 226 of clone 222 correspond respectively to branches 206, 208 of upstream repository 204. In this context, a first branch is a "corresponding branch" of a second branch when the second branch began as a copy of the first branch and then was subjected to one or more revisions, so that the first and second branch continue to correspond in content at least in part.

In addition, the server computer 202 hosts an SCM server 210, which comprises one or more application programs, libraries, APIs or other software elements that implement the features and functions that are further described herein. The SCM server 210 includes a pull request chain generator 212 (hereinafter referred to a chain generator 212), which is configured to generate and manage chains of smaller pull requests from larger pull requests as described in relation to FIG. 3.

User computers 220, 240 and 242 may host an SCM client 228 that includes complete implementations of functional logic for retrieving source code from the SCM server 210, creating forks/branches, editing source code, and generating requests to merge branches back into the upstream repository 204. The specific division of labor between the server 202 and the client 228 is not critical and may vary in different embodiments based upon performance tradeoffs and other factors.

In one implementation, the upstream repository 204 may be at server computer 202, and each of the user computers 220, 240, 242 hosts a local repository such as clone 222. Each repository on user computers 220, 240, 242 initially may be a complete clone of the upstream repository 204 after which changes in branches 224, 226 may be merged into corresponding branches 206, 208 of upstream repository 204.

The SCM server 210 may be coupled to a database 214 that is configured to store metadata relating to branches 206, 208 and other aspects of repository 204, such as data relating to each version of the upstream repository, and other project management data, and the like.

In a local implementation such as Bitbucket Server, the server computer 202 and user computers 220, 240, 242 are coupled to a LAN and/or WAN in the form of network 250 and are logically located behind a firewall or other security appliance; typically, the computers are associated with one business enterprise or institution.

In another implementation, where the SCM system is provided by a shared remote data center, the SCM system 200 may be implemented using one or more server computing instances that are instantiated on or hosted in a shared data center or cloud computing infrastructure. Examples include Amazon Web Services, Rackspace, and private cloud data centers. There may be any number of server computing instances instantiated from time to time based upon the number of user computers 220, 240, 242 that access the instances, or other performance requirements.

In the remote data center implementation, the network 250 may represent at least one internetwork, such as the public internet, in combination with one or more wired or wireless LANs, WANs, or other network or access infrastructure such as cable modems, routers, etc.

In either the local or remote arrangements, the user computers 220, 240, 242 may include a browser 230 that is configured to request, render and display electronic documents that conform to a markup language such as HTML, XML or extensions, and is capable of internally executing browser-executable code 232 such as JAVASCRIPT, ACTIVE SERVER PAGES, or other forms of code. Thus, in this arrangement, aspects of functional logic of the SCM system 200 may be distributed to the user computers 220, 240, 242 as browser-executable code 232, where appropriate. However, the use of browser-executable code 232 is not required and other embodiments may deliver pure HTML to the browser 232 for rendering. Each user computer 220, 240, 242 may manage a local repository such as clone 222 based upon a MERCURIAL/GIT repository.

Example Process

SCM systems often employ some form of indexing of source code files, text files, and configuration files to help perform searches in repositories so that bits of code can be re-used. To perform such indexing, files in the main or master branches of repositories are periodically scanned to determine if any files have changed since last indexing. If any such files are identified, their contents are indexed. This typically involves inspecting the files to identify one or more class names, methods, code snippets, etc. If any of the identified portions of the files have already been indexed, e.g., in relation to that file or to other files, the file name can be added to the list of files which include that identified portion. Otherwise, if any of the identified portions of the files have not been previously indexed, that identified portion is added to an index as a new item and the name of the file is stored in relation to that indexed item. Then, if a user wishes to search for method X, for example, a search engine can inspect the index for method X and then return the names of all the files that include or mention that method.

In one example, an integrated development environment (IDE) such as IntelliJ, XCode, etc., may be utilized for indexing the files.

Figure 3:
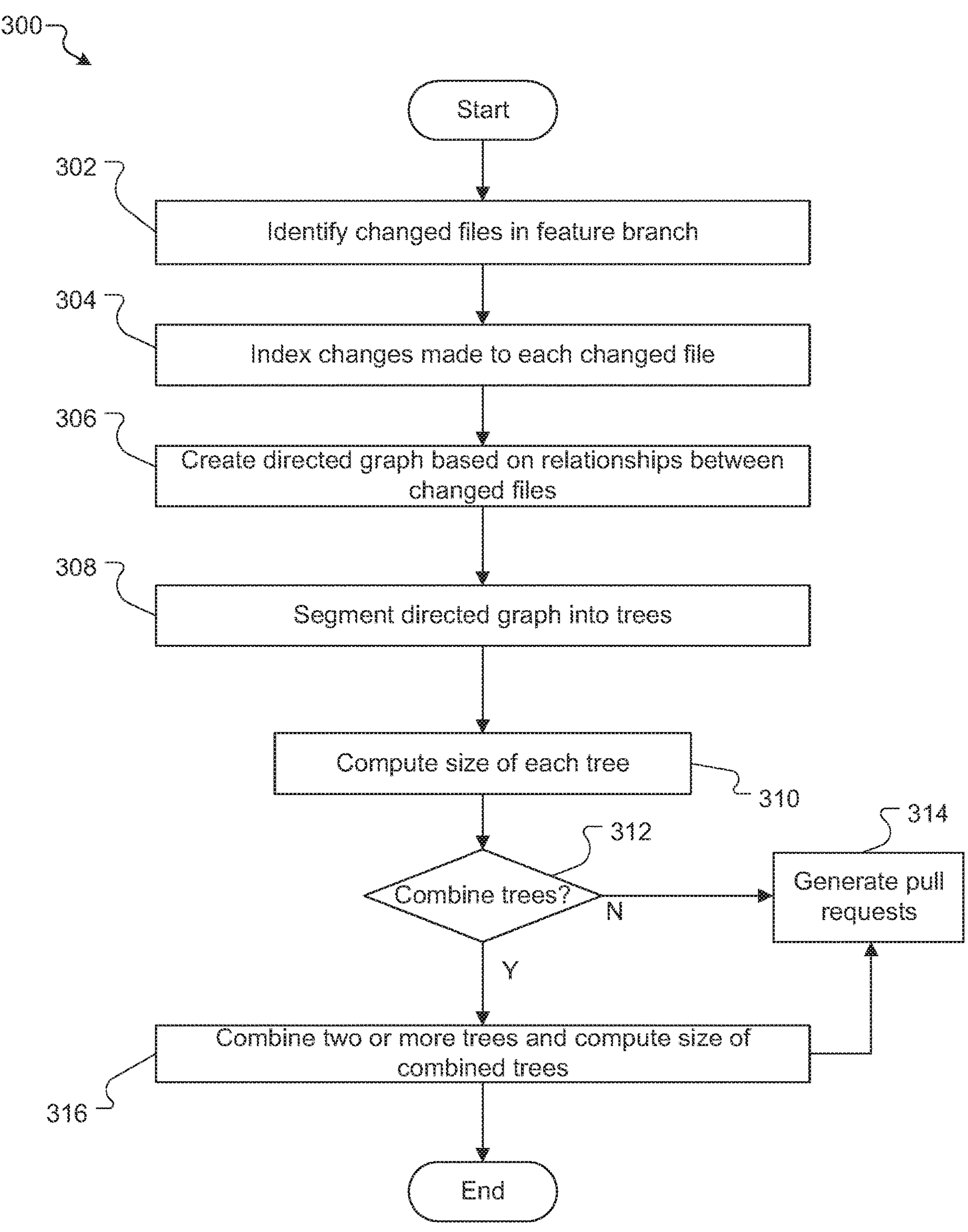
FIG. 3 illustrates an example process for automatically creating chained pull requests according to aspects of the present disclosure.

FIG. 3 illustrates an example method for automatically creating chained pull requests according to aspects of the present disclosure. In one example, a developer may create a fork from a main branch of a repository at a particular time and create a feature or clone branch in the user's client device. The developer may then make changes to the feature branch of the repository on his/her own client device. For example, the developer may add one or more new variables or functions, amend one or more existing variables or functions, or delete one or more existing variables or functions. Further, some changes made by the developer may affect configuration files, some changes may affect source code files, and other changes may affect other types of files such as test files, text files (e.g., README files), etc. In some cases, the developer may make a large number of such changes to the feature branch that affect a number of different types of files.

Once the developer has made all the changes he/she wishes to make, the developer may attempt to create a pull request.

In one example, the chain generator 212 may determine the number of files affected by the changes made in the feature branch. If the number of files affected by the changes are below a threshold number, the chain generator 212 may create a single pull request. Alternatively, if the number of files affected by the changes are above a threshold number, the chain generator 212 may generate and communicate a message to the developer via the user interface informing the developer that there are a large number of changes in the feature branch and suggesting that the developer create a chain of pull requests instead. The message may include an interactive element or affordance that allows the developer to select the option to create a chained pull request. When the user selects this interactive element or affordance the method 300 may be initiated.

In another instance, the SCM client 228 may display an element or affordance for creating a chained pull request and the developer may select this affordance once the developer is ready to request a reviewer to review the changes made by the developer and approve these changes before they can be merged with the main branch of the repository.

In any event, method 300 commences when a developer requests a pull request or a chain of pull requests to be created for a source branch (the feature branch, for example).

At step 302, the chain generator 212 categorizes all the changes files in the feature branch. As used herein, a repository file is considered a changed file if a method within a file is newly added, modified or deleted, a new class variable is newly added, modified or deleted, a class name is changed, a file is renamed or its location is updated, or a package is updated.

At step 302, the chain generator 212 identifies all such changed files, e.g., by comparing the files in the source branch (e.g., feature branch) with the files in the destination branch (e.g., the master branch) when the source branch was forked from the master branch. Upon comparing the source and destination branches, the chain generator 212 may generate a diff that indicates all the changed files in the feature branch. Once the chain generator 212 identifies these files, it is configured to determine the file types—e.g., whether the file is a project configuration file (e.g., an XML file, a YAML file, a shell script, etc.), a project source file (e.g., a Java file or cpp file), a test file (e.g., files names that end in 'Test'), or a text file such as a Readme file.

At step 304, the chain generator 212 requests the changes made to the changed files to be indexed. This may include calling an indexer module on the server computer 202 (not shown) to inspect the changed files and index any methods, classes, code snippets in the changed files. For each change in the changed files, the type of change is identified and an index value is created or updated. For example, if the change is addition of a class or method, the indexer determines whether the class or method already exists in the index. If it does, the file name is associated with that indexed class or method. Alternatively, if the class or method does not already exist in the index, a new index value is created and the file name is recorded in association with it. Similarly, if the change is a modification of an existing method, indexer may update the existing index value. On the other hand, if the change is a deletion of a class, method, or code snippet, the indexer may remove the file name against that indexed item. To create indexes, for each change, a key and a value may be created. The key may be the name of the changed variable, method, text, etc., and is used to retrieve data from the index. The value can be arbitrary data, which is associated with the key in the index. For instance, it may indicate the context in which the key is utilized (e.g., code, string, comment, file, etc.). For example, if method X has been added to file A, it may be indexed as MethodX, FileA. Similarly, if variable Y has been modified in file A, it may be indexed as VariableY, File A. When a file is indexed, the file content is ingested and a map from the keys found in the file to the associated values—i.e., a key and a corresponding assigned value, is returned.

Once the changed files have been indexed, the method proceeds to step 306, where relationships are created between the changed files based on the indexed keys and values. For example, consider if there are two changed files (fileA, fileB), where file A's method (methodA) signature is changed. If method A is also used in file B, file B will also be changed. In this case, there is a relationship between both file A and file B, i.e., change in file A's method A's signature has direct impact on file B, hence, there is a relationship between both these changed files. In one example, the relationships between the changed files can be identified from earlier indexes. For example, a list of all files that include methodA can be retrieved from the indexer and the chain generator 212 can retrieve the list of changed files from this list of files to identify all the changed files that have the changed method/function/class/snippet, etc.

Based on the identified relationships between changed files (e.g., based on the changes within the files), a directed graph is created at step 306. A directed graph is an inmemory data structure which is created by enumerating through each changed and existing indexes for a given repository. For example, consider the situation where methodA is used in methodB, and methodB is used in methodC. Then because of indexing, the chain generator 212 can identify relationships such as methodA→methodB→methodC and create a directed graph from these relationships. In some cases, changed files such as file A and file B may not be directly related and there could be multiple intermediate files between these two files, which were not modified. For example, consider the situation where file A's method internal implemented has changed and file X, which has not been changed, uses method A in method X, and file B uses method X in its own method B. In this case, file X is an intermediate file that connects files A and B. However, as file X is not part of the changed files it does not form part of the directed graph.

It will be appreciated that the directed graph depicts relationships between parent and children nodes. However, as changed and unchanged files (of the master branch) have been indexed, the chain generator 212 can easily identify the connected files between fileA and fileB and build the relationship between fileA and fileB.

Figure 4:
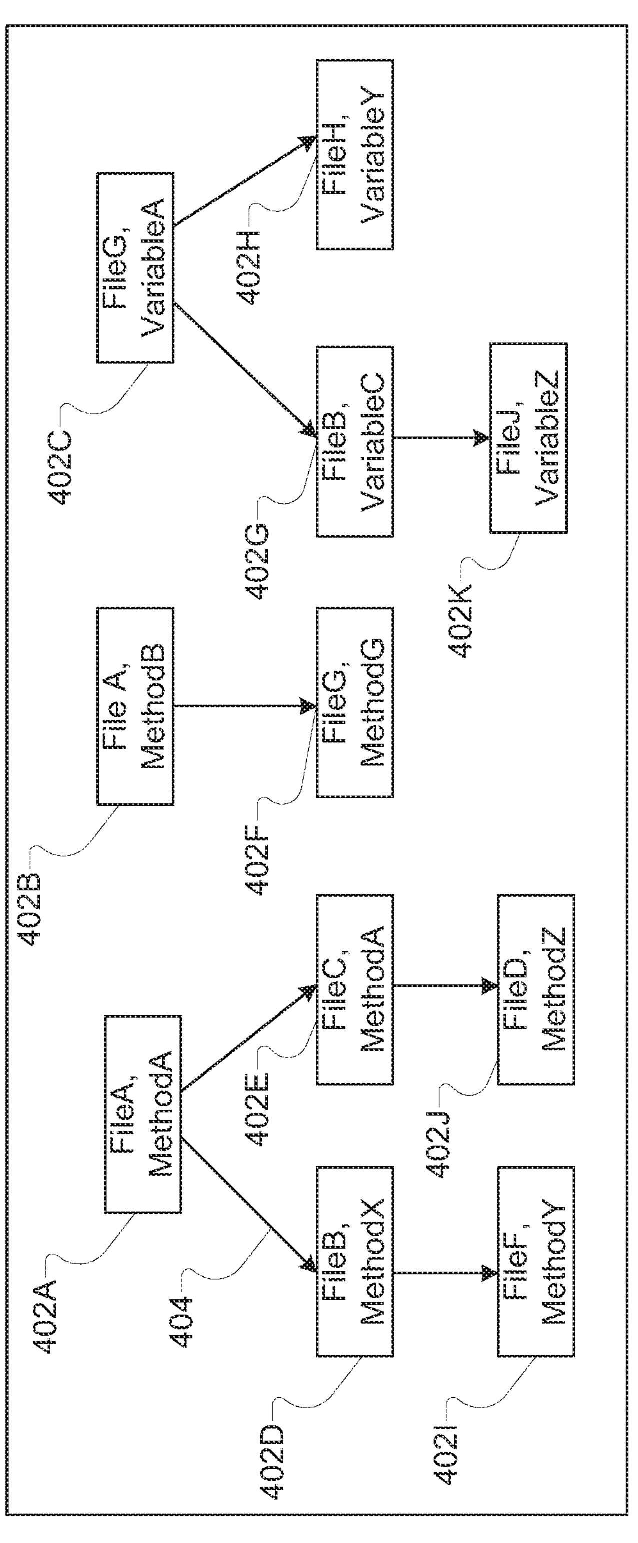
FIG. 4 illustrates an example directed graph according to aspects of the present disclosure.

FIG. 4 illustrates an example directed graph 400 that can be created at step 306. The directed graph 400 shows relationships between all the changed files. It includes edges 402 and each of the edges has a direction. This is usually indicated with an arrow 404 on the edge. For example, in FIG. 4, FileA, MethodA and FileB, MethodX are considered vertices and the directed edge, called an arc, is an ordered pair (FileA, MethodA, FileB, MethodX). The edge represented by FileB, MethodX is called the head and FileA, MethodA is called the tail of the arc; the edge FileB, MethodX is said to be a direct successor of FileA, MethodA and FileA, MethodA is said to be a direct predecessor of FileA, MethodA. The arc 404 is drawn as an arrow from FileA, MethodA to FileB, MethodX.

If a changed file includes a change that is not affected by other files, it may be the parent or root file and files that are affected by that changed file may be children nodes or successor edges of that changed file. Further, as seen in FIG. 4, the directed graph may have multiple such parent or root files and each parent/root file may have zero or more successor changed files. In graph 400, there are three root files 402A, 402B, 402C and each of these root files has one or more successor edges or children files that are affected by the changes made in the root files.

Once a directed graph is created, the method proceeds to step 308, where the directed graph is segmented into multiple trees rooted with a single file. To this end, a breadth-first search (BFS) is performed in the directed graph 400. BFS is an algorithm for searching a tree data structure for a node that satisfies a given property. In the present case, the BFS algorithm is performed to identify one or more tree roots, i.e., files with zero in-degree (i.e., no incoming edge from any other file) and explores all nodes at that depth. These zero-in-degree files are considered to be the roots of corresponding trees.

In the example shown in FIG. 4, the roots may be edges 402A, 402B and 402C. For each root, the chain generator 212 then performs a depth first search (DFS). DFS is an algorithm for traversing a tree that starts at a root node and explores as far as possible along each branch. This DFS is performed to identify all the cascading files associated with a root. In this way, the directed graph 400 is segmented into multiple single rooted trees. Each tree may be independent of other trees which means each change in one tree is independent of changes happening in other trees.

Figure 5C:
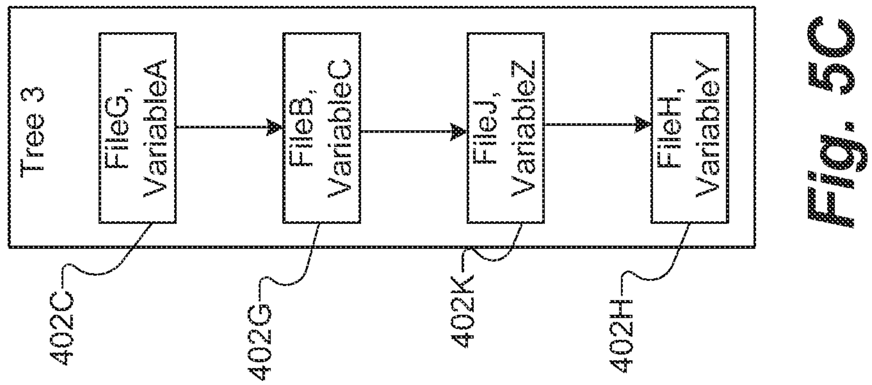
FIGS. 5A-5C illustrate example trees according to aspects of the present disclosure.
Figure 5B:
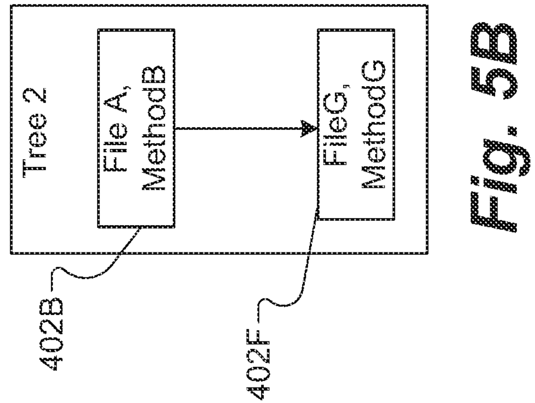
Figure 5A:
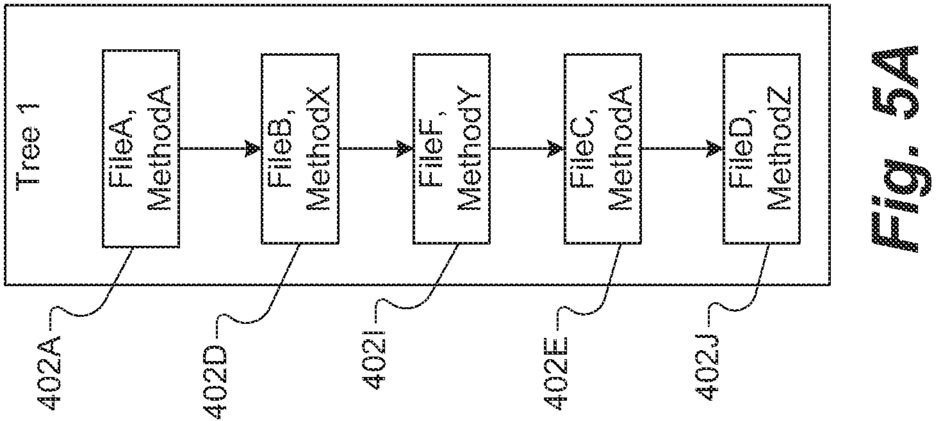

In the example directed graph shown in FIG. 4, the graph can be segmented into three trees as shown in FIGS. 5A-5C. In particular, using BFS, the roots of the three trees are identified. Then using DFS, the chain generator 212 identifies the edges 402A, 402D, 402E and 402J as being part of tree 1 in that order. This is shown in FIG. 5A. Similarly, using BFS and then DFS, the edges 402B and 402F are identified as being part of tree 2 in that order. This is shown in FIG. 5B. In addition, edges 402C, 402G, 402K, and 402H are identified as being part of tree 3 in that order. This is shown in FIG. 5C.

Accordingly, at step 308, the chain generator 212 identifies a forest that comprises of one or more trees with particular changes where the changes in one tree do not affect the changes in another tree.

Next, for each tree identified in step 308, the size of the tree is computed at step 310. Size of the tree is generally equal to the number of files impacted by a particular change or root edge.

In the examples depicted in FIG. 5A-5C, the chain generator 212 may compute the tree sizes as follows—

TABLE A

Example trees and sizes

| Tree | Size |
|---|---|
| Tree 1 | 5 |
| Tree 2 | 2 |
| Tree 3 | 4 |

Next, at step 312, a determination is made whether one or more trees can be combined. This determination is based on a number of factors. For example, it may be determined on a threshold number of changed files that can be added to any chain of the chained pull request. This threshold number may be provided by the developer when the developer request the chained pull request to be created or it may be a preset default value (e.g., 10 files, 15 files, etc.). In another example, this determination may be based on the type or category of files. For example, trees that have files of the same type may be combined into a single tree whereas trees that have files of different types (such as configuration files and source code files) may not be combined together.

In yet another example, the determination to combine trees may be based on a threshold number of pull requests allowed in the chain. This threshold number may be provided by the developer when the developer request the chained pull request to be created or it may be a preset default value (e.g., 5 pull requests, 10 pull requests, etc.).

If at step 312, it is determined that one or more trees do not need to be combined (e.g., because the number of trees is less than the threshold number of pull requests allowed in the chain) or cannot be combined (e.g., the combination of none of the trees will result in a number of files in the combined tree that is below the threshold value or combinable trees are for different file categories), the method proceeds to step 314 where the chained pull requests are created. In particular, for each tree identified at step 308, a corresponding pull request is created. In certain embodiments, the pull requests are ordered in the chain based on one or more parameters, such as the categories of the changed files.

For example, changes in project configuration files should be merged with the master branch first, followed by project source files, and then text files. Accordingly, the order of the pull requests in the chain can depend on the category of each tree.

Figure 6:
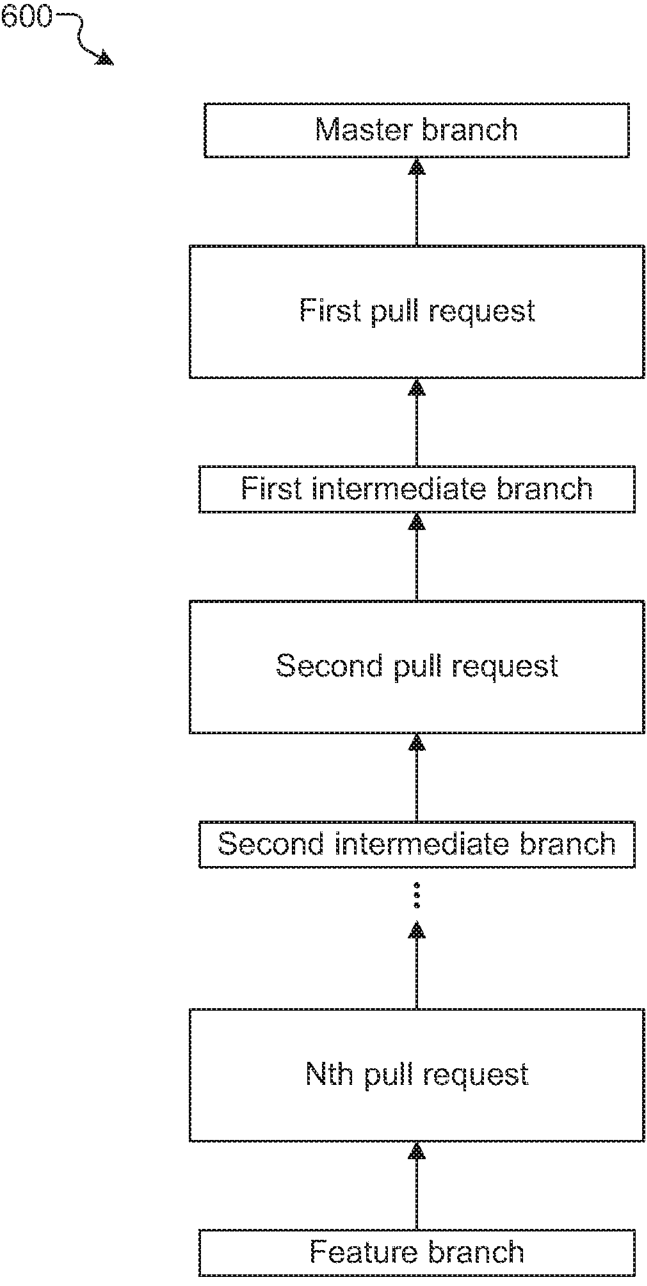
FIG. 6 illustrates an example schematic of a chained pull request according to some aspects of the present disclosure.

Any given pull request includes a target branch (i.e., a branch in which changes are to be incorporated) and a source branch (i.e., a source branch from which changes are to be incorporated in the target branch). When a single pull request is created, the target branch is usually the master branch and the source branch is the clone or feature branch. However, when a chain of pull requests are to be created, the first pull request in the chain may have the master branch as its target branch but the second pull request in the chain would no longer have the master branch as the target branch as the master branch could have changed once the first pull request is approved. To account for this, the chain generator 212 creates an intermediate branch from its parent branch for each pull request, such that each pull request in the chain has a source and target branch. The first intermediate branch is cut out of the master branch (e.g., main branch), and then the second intermediate branch is cut out of the first branch and so on. For example, if a chain includes three pull requests, the target branch of the first pull request is the master branch and the source branch of the first pull request may be the first intermediate branch. The target branch of the second pull request may be the first intermediate branch whereas its source branch may be the second intermediate branch. The target branch for the third pull request may be the second intermediate branch and its source branch may be the original feature branch. FIG. 6 illustrates an example pull request chain 600 with intermediate branches. In this example, the first pull request has the master branch as its target and the first intermediate branch as its source. The next pull request in the chain 600 has the first intermediate branch as its source and a second intermediate branch as its source and the nth or last pull request in the chain 600 has the last intermediate branch as its target and the original feature branch as its source. The chain 600 may therefore be as follows feature branch→second intermediate branch→first intermediate branch→master branch.

Alternatively, if at step 312 it is determined that one or more trees can be combined (e.g., because the number of trees is more than the threshold number of pull requests allowed in the chain, the combination of one or more trees will result in a number of files in the combined tree that is below the threshold value, or there are combinable trees in the same file categories), the method proceeds to step 314, where two or more trees are combined and a new size is calculated for the combined trees.

For example, in the trees depicted in table A, trees 2 and 3 may be combined if they meet the one or more parameters for combining trees and the new size of the combined tree may be computed as follows—

TABLE B

| Combined trees and sizes | |
|---|---|
| Tree | Size |
| Tree 1 | 5 |
| Tree 2, Tree 3 | 2 + 4 = 6 |

Thereafter, the method proceeds to step 314 where individual pull requests are created for each of the trees after two or more trees have been combined. For the example depicted in table B, the chain generator 212 creates two pull requests—PR1 for tree 1 and PR2 for the combination of trees 2 and 3. Here, for PR1, the target branch is the master branch and for PR2 the target branch is an intermediate branch with tree 1 changes incorporated.

In this manner, by categories the changed files into categories based on file types and determining the changed files that have a relation (e.g., files that are affected by other files or affect other files), the presently disclosed chain generator 212 and method can automatically create chains of pull requests such that any one pull request includes all related changes and the pull requests are ordered based on the order in which the changes need to be reviewed and merged in the master branch.

In the example method 300 described above, independent trees that do not have any common nodes are merged or combined based on tree sizes and file configuration types. In some cases, trees may also be merged if they have common child nodes or intermediate nodes.

Figure 7:
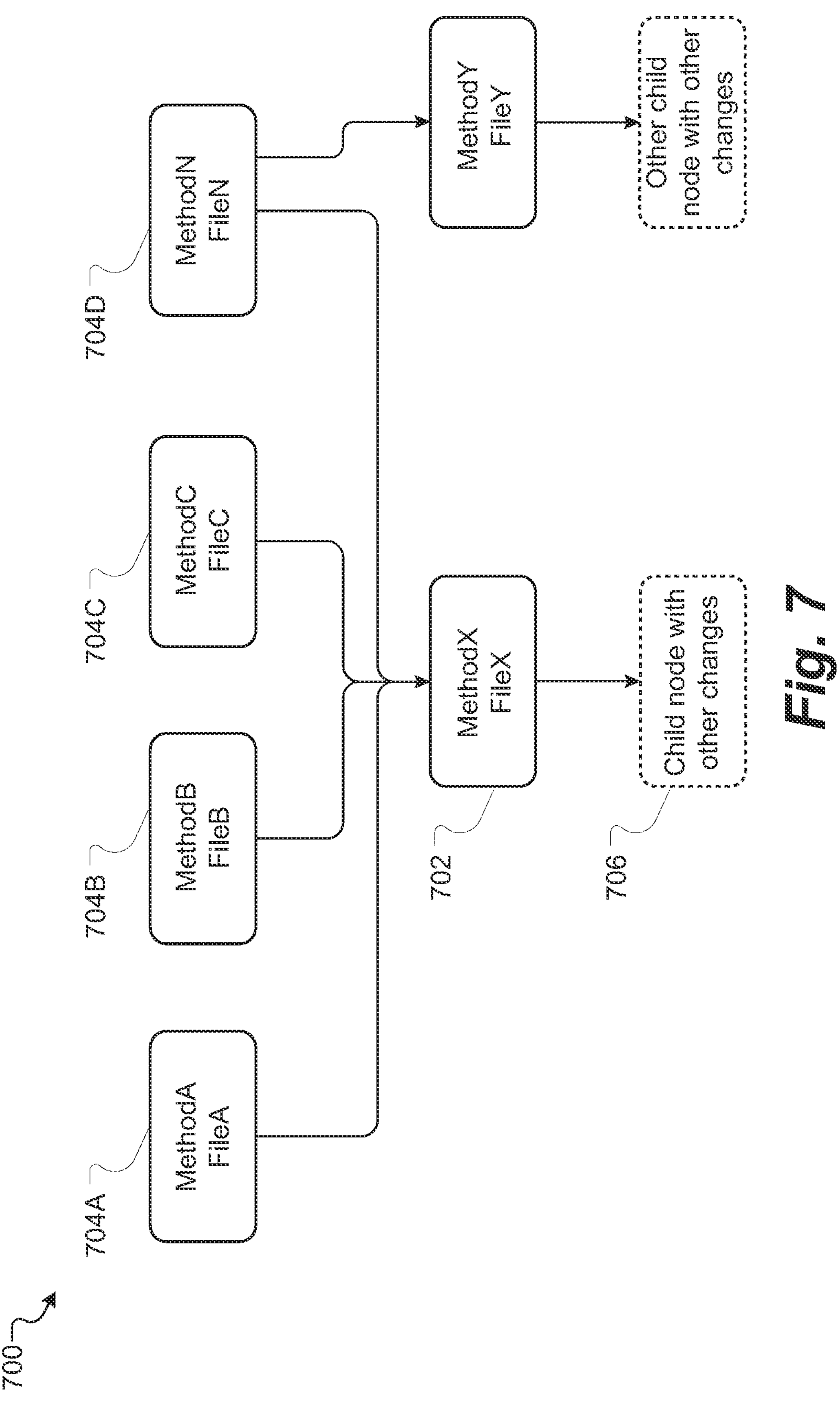
FIG. 7 illustrates an example directed graph according to some aspects of the present disclosure.

FIG. 7 illustrates a directed graph 700 that includes a scenario where the directed graph includes intermediate nodes that are common for two or more root nodes.

In particular, in this example, the node 702, which is a child of root nodes 704A-704D and a parent node to a further child node 706, is considered an intermediate node. This node 702 is common to four root nodes—704A, 704B, 704C, and 704D. This may be because the intermediate child node 702 incorporates each of the methods of files A, B C and N. Further, MethodX of file X in this node may be included in one or more other children tree nodes 706 that have other changes.

Figure 8:
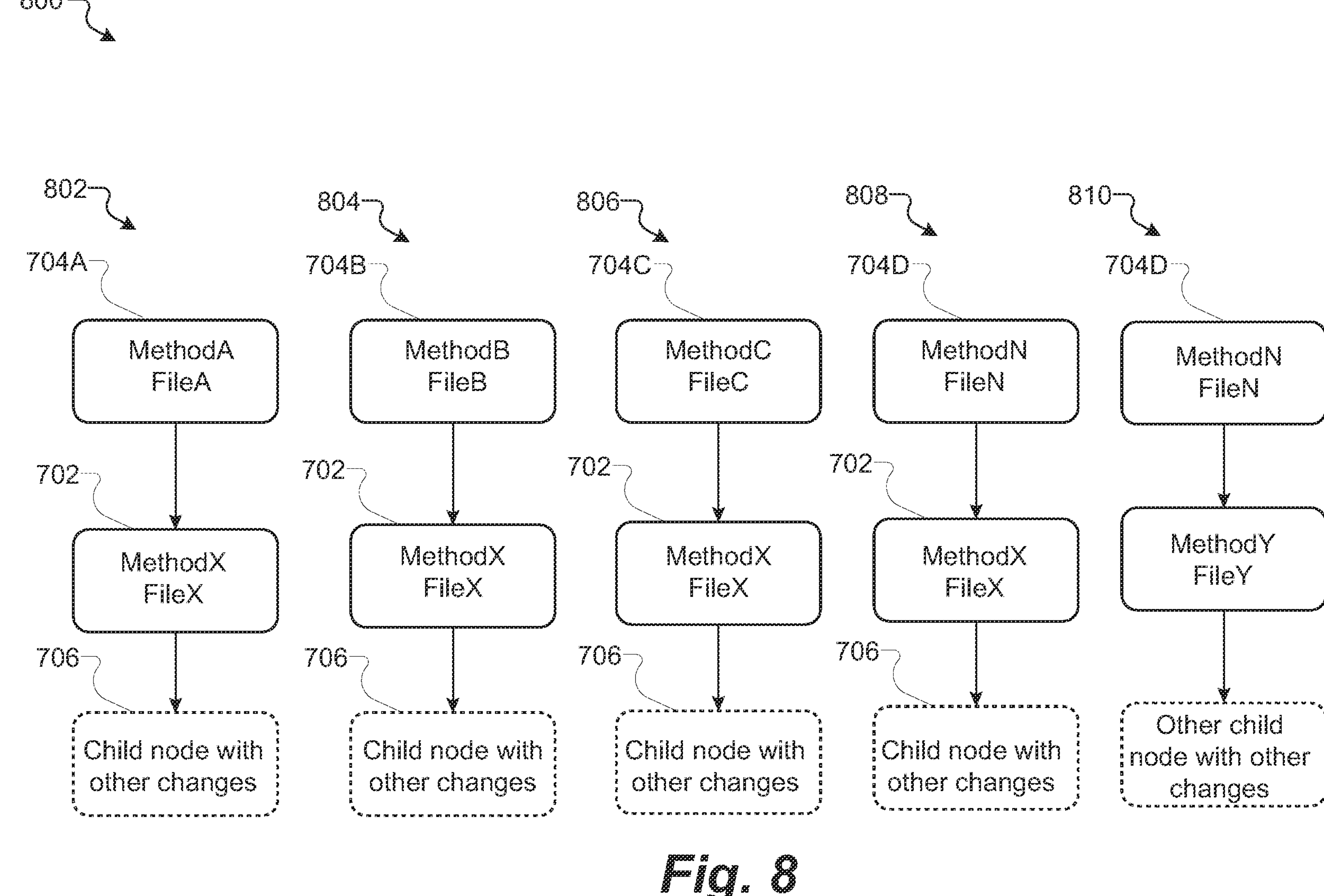
FIG. 8 illustrates example trees for the directed graph of FIG. 7.

When such a directed graph 700 is segmented as described above with respect to step 308, four trees are obtained—one for each root of the directed graph. FIG. 8 is a schematic 800 of the trees 802-810 obtained after segmenting the directed graph 700. In this example, for each root node 704A-70D, the chain generator 212 has generated an independent tree. Further, as root node 704D included two children nodes at the same level, it was further bifurcated into two trees—808 and 810. As seen, from FIG. 8, four of the five trees (i.e., trees 802-808) include the same common child/intermediate node—node 702.

Figure 9:
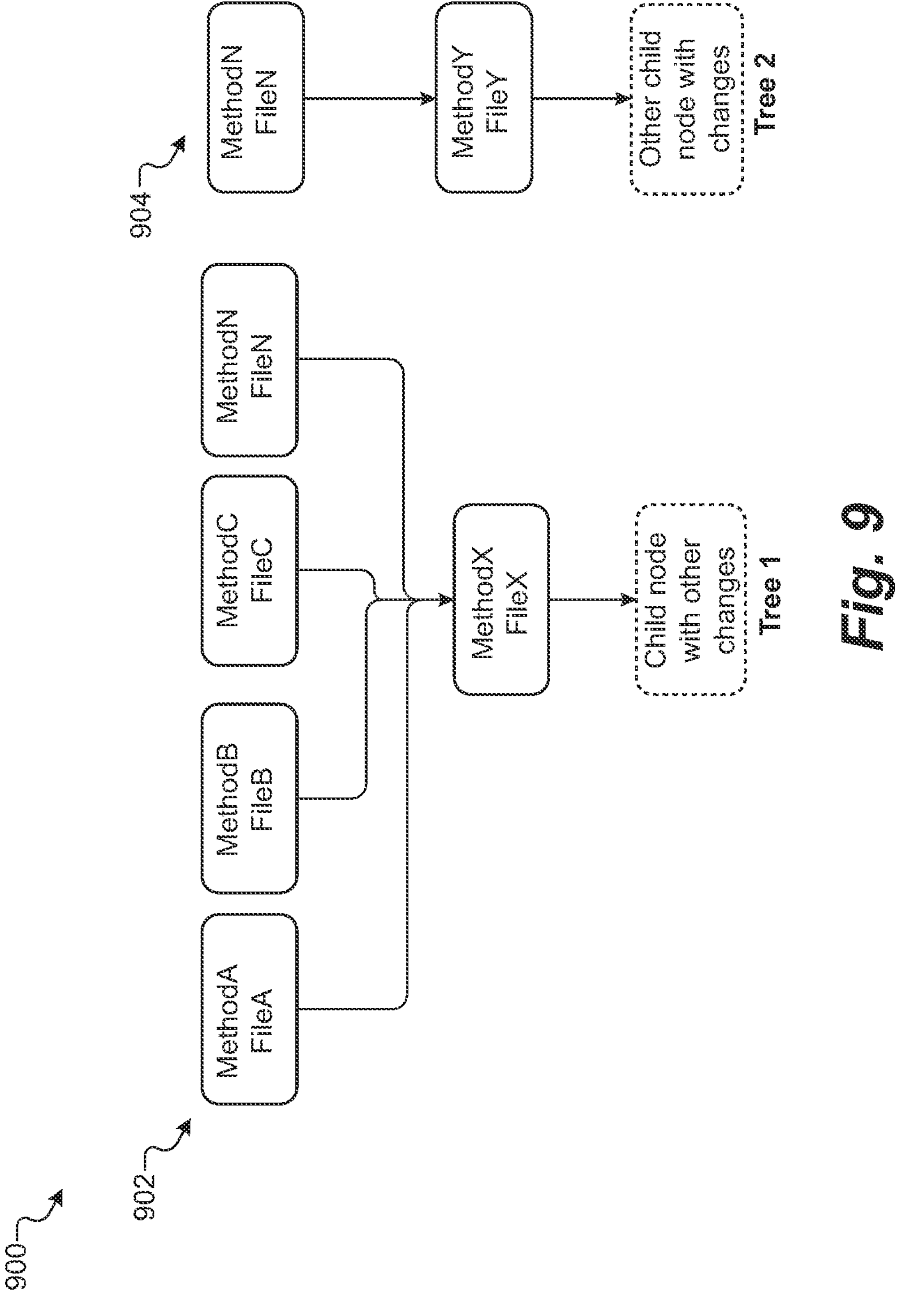
FIG. 9 illustrates merged trees for the example shown in FIG. 8.

To address these types of cases, when trees are subsequently merged or combined, e.g., at step 310 of method 300, a determination is made whether a particular tree node has multiple parents. If it is determined that a tree node has multiple parents, the chain generator 212 is configured to merge or combine the trees that have the common intermediate/child node. FIG. 9 is a schematic 900 showing the trees after the combining step. In this case, trees 802-808 are combined to form merged tree 902. If trees with common intermediate/child nodes are not combined in this manner, there is a high chance that the corresponding pull request will result in a build failure.

Accordingly, in the example shown in FIG. 7, the directed graph 700 results in two trees, merged tree 902 and tree 904. Both these trees can create separate chained PRs and any one of them can take precedence over the other while creating the two chained PRs. For example, PR1 with Tree1 can set the target branch as master and PR2 with Tree2 can set target branch with PR1's branch.

In some examples, after this step, the method may continue back to step 310, where a determination is made whether trees 902 and 904 can be combined based on the one or more factors described previously.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired, and/or program logic to implement the techniques.

Figure 10:
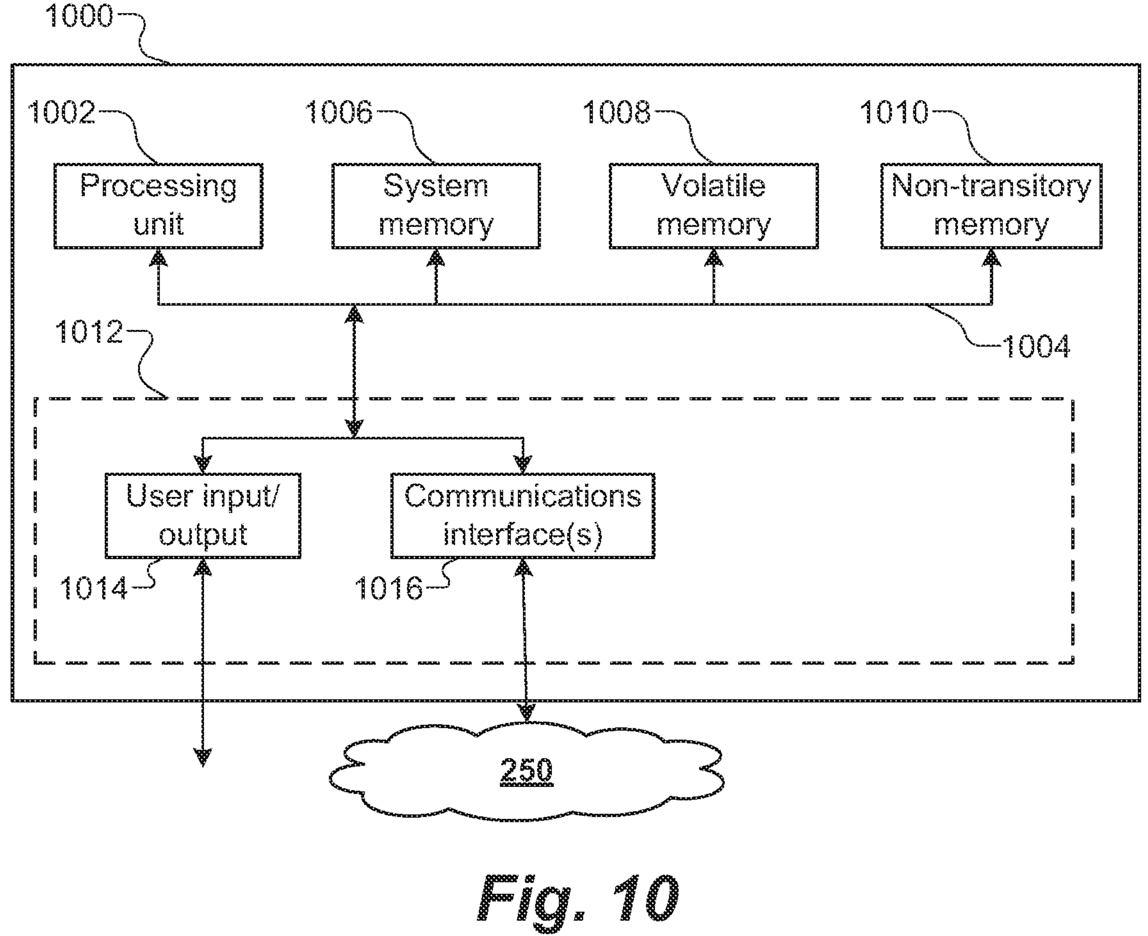
FIG. 10 illustrates a computer system with which various embodiments may be used.

FIG. 10 provides a block diagram of a computer processing system 1000 configurable to implement embodiments and/or features described herein. System 1000 is a general purpose computer processing system. It will be appreciated that FIG. 3 does not illustrate all functional or physical components of a computer processing system. For example, no power supply or power supply interface has been depicted, however system 1000 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 1000 includes at least one processing unit 1002—for example a general or central processing unit, a graphics processing unit, or an alternative computational device). Computer processing system 1000 may include a plurality of computer processing units. In some instances, where a computer processing system 1000 is described as performing an operation or function all processing required to perform that operation or function will be performed by processing unit 1002. In other instances, processing required to perform that operation or function may also be performed by remote processing devices accessible to and useable by (either in a shared or dedicated manner) system 1000.

Through a communications bus 1004, processing unit 1002 is in data communication with a one or more computer readable storage devices which store instructions and/or data for controlling operation of the processing system 1000. In this example system 1000 includes a system memory 1006 (e.g., a BIOS), volatile memory 1008 (e.g., random access memory such as one or more DRAM applications), and non-volatile (or non-transitory) memory 1010 (e.g., one or more hard disks, solid state drives, or other non-transitory computer readable media). Such memory devices may also be referred to as computer readable storage media (or a computer readable medium).

System 1000 also includes one or more interfaces, indicated generally by 1012, via which system 1000 interfaces with various devices and/or networks. Generally speaking, other devices may be integral with system 1000, or may be separate. Where a device is separate from system 1000, connection between the device and system 1000 may be via wired or wireless hardware and communication protocols, and may be a direct or an indirect (e.g., networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, Wi-Fi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 1000 connects—whether by wired or wireless means—include one or more input/output devices (indicated generally by input/output device interface 1014). Input devices are used to input data into system 1000 for processing by the processing unit 1002. Output devices allow data to be output by system 1000. Example input/output devices are described below; however, it will be appreciated that not all computer processing systems will include all mentioned devices, and that additional and alternative devices to those mentioned may well be used.

For example, system 1000 may include or connect to one or more input devices by which information/data is input into (received by) system 1000. Such input devices may include keyboards, mice, trackpads (and/or other touch/contact sensing devices, including touch screen displays), microphones, accelerometers, proximity sensors, GPS devices, touch sensors, and/or other input devices. System 1000 may also include or connect to one or more output devices controlled by system 1000 to output information. Such output devices may include devices such as displays (e.g., cathode ray tube displays, liquid crystal displays, light emitting diode displays, plasma displays, touch screen displays), speakers, vibration applications, light emitting diodes/other lights, and other output devices. System 1000 may also include or connect to devices which may act as both input and output devices, for example memory devices/computer readable media (e.g., hard drives, solid state drives, disk drives, compact flash cards, SD cards, and other memory/computer readable media devices) which system 1000 can read data from and/or write data to, and touch screen displays which can both display (output) data and receive touch signals (input).

System 1000 also includes one or more communications interfaces 1016 for communication with a network, such as network 250 of SCM system 200. Via a communications interface 1016 system 1000 can communicate data to and receive data from networked devices, which may themselves be other computer processing systems.

System 1000 may be any suitable computer processing system, for example, a server computer system, a desktop computer, a laptop computer, a netbook computer, a tablet computing device, a mobile/smart phone, a personal digital assistant, or an alternative computer processing system.

System 1000 stores or has access to computer applications (also referred to as software or programs)—i.e., computer readable instructions and data which, when executed by the processing unit 1002, configure system 1000 to receive, process, and output data. Instructions and data can be stored on non-transitory computer readable media accessible to system 1000. For example, instructions and data may be stored on non-transitory memory 1010. Instructions and data may be transmitted to/received by system 1000 via a data signal in a transmission channel enabled (for example) by a wired or wireless network connection over interface such as 1012.

Applications accessible to system 1000 will typically include an operating system application such as Microsoft Windows™, Apple macOS™, Apple iOS™, Android™ Unix™, or Linux™.

System 1000 also stores or has access to applications which, when executed by the processing unit 1002, configure system 1000 to perform various computer-implemented processing operations described herein. For example, and referring to SCM system 200 of FIG. 2 above, user computer 220 includes an SCM client application 228 which configures the user computer 220 to perform client system operations, and server computer 202 includes SCM server application 210 which configures the server environment computer processing system(s) to perform the described server environment operations.

In some cases, part or all of a given computer-implemented method will be performed by a single computer processing system 1000, while in other cases processing may be performed by multiple computer processing systems in data communication with each other.

In another approach, a computer system comprises a server computer comprising one or more non-transitory computer-readable data storage media stored with one or more sequences of instructions which when executed using a particular user computer among a plurality of user computers cause the particular user computer to perform: using the particular user computer, alone or in combination with the server computer, the techniques that are described herein; and in the server computer, stored downloading instructions which, when executed using the server computer, cause downloading a plurality of copies of the one or more sequences of instructions to the plurality of user computers.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:

generating an indexed plurality of changes by indexing a plurality of changes made to a plurality of files in a feature branch of a source code repository, wherein each indexed change of the indexed plurality of changes is represented by a respective key and a respective value, wherein the respective key is mapped to the respective value and the respective value is stored in the source code repository;

determining one or more relationships between the plurality of files based on the respective keys and the respective values by enumerating through the indexed plurality of changes in the source code repository;

based on the determined one or more relationships, generating a directed graph, the directed graph comprising:

a plurality of nodes corresponding to the plurality of files, the plurality of nodes including one or more parent nodes and one or more children nodes based on the determined one or more relationships between the plurality of files;

a plurality of edges extending between the plurality of nodes, each edge having a respective directionality;

storing the directed graph in a data repository;

segmenting the directed graph into a first plurality of trees, comprising, for each tree of the first plurality of trees:

performing, in the directed graph, a breadth first search (BFS) to identify at least one zero-in-degree file of the plurality of files, the identified at least one zero-in-degree file having no incoming edge from another file of the plurality of files and corresponding to a respective parent node of the one or more parent nodes; and subsequent to performing the BFS, performing a depth first search (DFS) to identify at least one cascading file downstream of the identified at least one zero-in-degree file and corresponding to a respective child node of the one or more children nodes;

generating a series of pull requests based on the first plurality of trees, wherein each pull request in the series of pull requests corresponds to a tree of the first plurality of trees; and causing display, via a display of a first client device, of a pull request user interface, the pull request user interface including display of the series of pull requests in a sequence determined using a particular tree of the first plurality of trees of the directed graph, wherein each pull request includes an indication of the indexed plurality of changes associated with respective files of the plurality of files associated with a respective pull request of the series of pull requests.

2. The method of claim 1, further comprising combining two or more trees of the first plurality of trees, comprising:

determining whether the two or more of the first plurality of trees can be combined; and upon determining that the two or more trees of the first plurality of trees can be combined, combining the two or more trees to create a merged tree, wherein the series of pull requests is based on a number of trees after combining the two or more trees to create the merged tree.

3. The method of claim 2, further comprising:

determining a size of each of the first plurality of trees, wherein the size indicates a number of changed files in each respective tree; and wherein the determining whether two or more of the first plurality of trees can be combined is based on a threshold number of changed files that can be added to a pull request in the series of pull requests.

4. The method of claim 2, further comprising:

determining a type or a category of each of the files; and wherein the determining whether two or more of the first plurality of trees can be combined is based on the type or the category of the files in the two or more of the first plurality of trees.

5. The method of claim 2, wherein the determining whether two or more of the first plurality of trees can be combined is based on a threshold number of pull requests allowed in the series of pull requests.

6. The method of claim 2, wherein the determining whether two or more of the first plurality of trees can be combined includes:

determining whether two or more of the first plurality of trees include a common child node; and determining that the two or more of the first plurality of trees can be combined upon determining that two or more of the first plurality of trees include a common child node.

7. The method of claim 1, wherein generating the series of pull requests comprises creating a first intermediate branch for a first pull request in the series of pull requests, such that a master branch is a target branch of the first pull request and the first intermediate branch is a source branch of the first pull request.

8. The method of claim 7, wherein generating the series of pull requests further comprises creating a second intermediate branch from the first intermediate branch for a second pull request in the series of pull requests, such that the first intermediate branch is the target branch for the second pull request and the second intermediate branch is the source branch for the second pull request.

9. The method of claim 1, wherein performing the BFS includes performing the BFS to identify one or more tree roots.

10. The method of claim 9, wherein the performing the DFS includes performing the DFS to identify one or more cascading files associated with each of the identified one or more tree roots.

11. The method of claim 1, further comprising:

in accordance with the first plurality of trees being greater in number than a threshold number of pull requests, further segmenting the directed graph into a second plurality of trees, wherein segmenting the directed graph into a second plurality of trees includes combining two or more trees of the first plurality of trees to obtain the second plurality of trees, wherein:

the threshold number of pull requests corresponds to an allowable number of pull requests in the series of pull requests; and the second plurality of trees is one of smaller in number than the threshold number of pull requests or equal in number to the threshold number of pull requests.

12. A non-transitory computer-readable storage media comprising instructions which, when executed by a processing unit, cause the processing unit to:

generate an indexed plurality of changes by indexing a plurality of changes made to a plurality of files in a feature branch of a source code repository, wherein each indexed change of the indexed plurality of changes is represented by a respective key and respective value, wherein the respective key is mapped to the respective value and the respective value is stored in the source code repository;

determine one or more relationships between the plurality of files based on respective keys and the respective values by enumerating through the indexed plurality of changes in the source code repository;

based on the determined one or more relationships, generate a directed graph, the directed graph comprising:

a plurality of nodes corresponding to the plurality of files, the plurality of nodes including one or more parent nodes and one or more children nodes based on the determined one or more relationships between the plurality of files; and a plurality of edges extending between the plurality of nodes, each edge having a respective directionality;

store the directed graph in a data repository;

segment the directed graph into a first plurality of trees, comprising, for each tree of the first plurality of trees:

performing, in the directed graph, a breadth first search (BFS) to identify at least one zero-in-degree file of the plurality of files, the identified at least one zero-in-degree file having no incoming edge from another file of the plurality of files and corresponding to a respective parent node of the one or more parent nodes; and subsequent to performing the BFS, performing a depth first search (DFS) to identify at least one cascading file downstream of the identified at least one zero-in-degree file and corresponding to a respective child node of the one or more children nodes;

generate a series of pull requests based on the first plurality of trees, wherein each pull request in the series of pull requests corresponds a tree of the first plurality of trees; and cause display, via a display of a first client device, of a pull request user interface, the pull request user interface including display of the series of pull requests in a sequence using a particular tree of the first plurality of trees of the directed graph, wherein each pull request includes an indication of the indexed plurality of changes associated with respective files of the plurality of files associated with a respective pull request of the series of pull requests.

13. The non-transitory computer-readable storage media of claim 12, further comprising instructions which when executed by the processing unit cause the processing unit to:

combine two or more trees of the first plurality of trees by:

determining whether the two or more of the first plurality of trees can be combined; and upon determining that the two or more trees of the first plurality of trees can be combined, combining the two or more trees to create a merged tree, wherein the series of pull requests is based on a number of trees after the combining step.

14. The non-transitory computer-readable storage media of claim 13, further comprising instructions which when executed by the processing unit cause the processing unit to:

determine a size of each of the first plurality of trees, wherein the size indicates a number of changed files in each respective tree; and wherein the determining whether two or more of the first plurality of trees can be combined is based on a threshold number of changed files that can be added to a pull request in the series of pull requests.

15. The non-transitory computer-readable storage media of claim 13, further comprising instructions which when executed by the processing unit cause the processing unit to:

determine a type or a category of each of the files; and wherein the determining whether two or more of the first plurality of trees can be combined is based on the type or the category of the files in the two or more of the first plurality of trees.

16. The non-transitory computer-readable storage media of claim 13, wherein the determining whether two or more of the first plurality of trees can be combined is based on a threshold number of pull requests allowed in the series of pull requests.

17. The non-transitory computer-readable storage media of claim 13, wherein determining whether two or more of the first plurality of trees can be combined includes:

determining whether two or more of the first plurality of trees include a common child node; and determining that the two or more of the first plurality of trees can be combined upon determining that two or more of the first plurality of trees include a common child node.

18. The non-transitory computer-readable storage media of claim 12, wherein generating the series of pull requests comprises creating a first intermediate branch for a first pull request in the series of pull requests, such that a master branch is a target branch of the first pull request and the first intermediate branch is a source branch of the first pull request.

19. The non-transitory computer-readable storage media of claim 18, wherein generating the series of pull requests further comprises creating a second intermediate branch from the first intermediate branch for a second pull request in the series of pull requests, such that the first intermediate branch is the target branch for the second pull request and the second intermediate branch is the source branch for the second pull request.

20. The non-transitory computer-readable storage media of claim 12, wherein performing the BFS further includes performing the BFS to identify one or more tree roots.

21. The non-transitory computer-readable storage media of claim 20, wherein performing the DFS further includes performing the DFS to identify one or more cascading files associated with each of the identified one or more tree roots.

22. The non-transitory computer-readable storage media of claim 12, further comprising instructions which when executed by the processing unit cause the processing unit to:

in accordance with the first plurality of trees being greater in number than a threshold number of pull requests, combine two or more trees of the first plurality of trees to obtain a second plurality of trees, wherein:

the threshold number of pull requests corresponds to an allowable number of pull requests in a series of pull requests; and the second plurality of trees is one of smaller in number than the threshold number of pull requests or equal in number to the threshold number of pull requests.

* * * * *